(12) United States Patent
Zhong et al.

(10) Patent No.: US 11,177,692 B2
(45) Date of Patent: Nov. 16, 2021

(54) ELECTRICAL APPARATUS

(71) Applicant: Tyco Electronics (Shanghai) Co. Ltd., Shanghai (CN)

(72) Inventors: Yuan Zhong, Shanghai (CN); Chenxi Wang, Shanghai (CN); Weifeng Bian, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 128 days.

(21) Appl. No.: 16/460,339

(22) Filed: Jul. 2, 2019

(65) Prior Publication Data
US 2020/0014242 A1 Jan. 9, 2020

(30) Foreign Application Priority Data

Jul. 3, 2018 (CN) .......................... 201810718103.X

(51) Int. Cl.
*H02J 50/10* (2016.01)
*H02J 50/90* (2016.01)
*H01F 38/14* (2006.01)

(52) U.S. Cl.
CPC .............. *H02J 50/10* (2016.02); *H01F 38/14* (2013.01); *H02J 50/90* (2016.02)

(58) Field of Classification Search
None
See application file for complete search history.

(56) References Cited

U.S. PATENT DOCUMENTS

| 2010/0271296 | A1* | 10/2010 | Kopychev | H02J 50/005 345/156 |
| 2014/0001880 | A1* | 1/2014 | Herglotz | E05D 11/0081 307/104 |
| 2015/0130287 | A1* | 5/2015 | Steudtner | E05F 15/00 307/104 |
| 2017/0048457 | A1* | 2/2017 | Eguchi | H02J 50/10 |
| 2017/0069422 | A1 | 3/2017 | Wang et al. | |
| 2018/0102213 | A1* | 4/2018 | Hanabusa | H01F 5/003 |
| 2018/0248587 | A1* | 8/2018 | Wang | H04B 5/0093 |

* cited by examiner

*Primary Examiner* — Jared Fureman
*Assistant Examiner* — Joel Barnett
(74) *Attorney, Agent, or Firm* — Barley Snyder

(57) ABSTRACT

An electrical apparatus comprises a main body, a pivotal part pivotally connected to the main body, a first coil mounted on the main body, and a second coil mounted on the pivotal part. The first coil at least partly passes through the second coil to form an electromagnetic coupling between the first coil and the second coil that wirelessly supplies power between the main body and the pivotal part.

20 Claims, 16 Drawing Sheets

ELECTRICAL APPARATUS

CROSS-REFERENCE TO RELATED APPLICATION

This application claims the benefit of the filing date under 35 U.S.C. § 119(a)-(d) of Chinese Patent Application No. 201810718103.X, filed on Jul. 3, 2018.

FIELD OF THE INVENTION

The present invention relates to an electrical apparatus and, more particularly, to an electrical apparatus enabling wireless power supply between parts which pivot relative to each other.

BACKGROUND

In electrical appliances, in particular household appliances, two parts having a relative pivoting movement relationship are generally connected by a hinge device. Because of a need to communicate between the parts, such as a need to transmit power between the parts, wires are required to pass through hinge holes to transmit power from one end of the hinge device to the other.

Due to the need to pass the wires through the hinge hole, this arrangement complicates assembly and disassembly processes of the electrical appliances. Due to a limited size of the hinge hole, this arrangement makes the hinge hole unable to accommodate more wires, and therefore the number of power consumption devices is limited. Further, because the wire passing through the hinge is driven to reciprocate by the hinge during the pivoting movement, this arrangement is liable to cause fatigue and failure of the wire, greatly reducing reliability of power transmission.

SUMMARY

An electrical apparatus comprises a main body, a pivotal part pivotally connected to the main body, a first coil mounted on the main body, and a second coil mounted on the pivotal part. The first coil at least partly passes through the second coil to form an electromagnetic coupling between the first coil and the second coil that wirelessly supplies power between the main body and the pivotal part.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
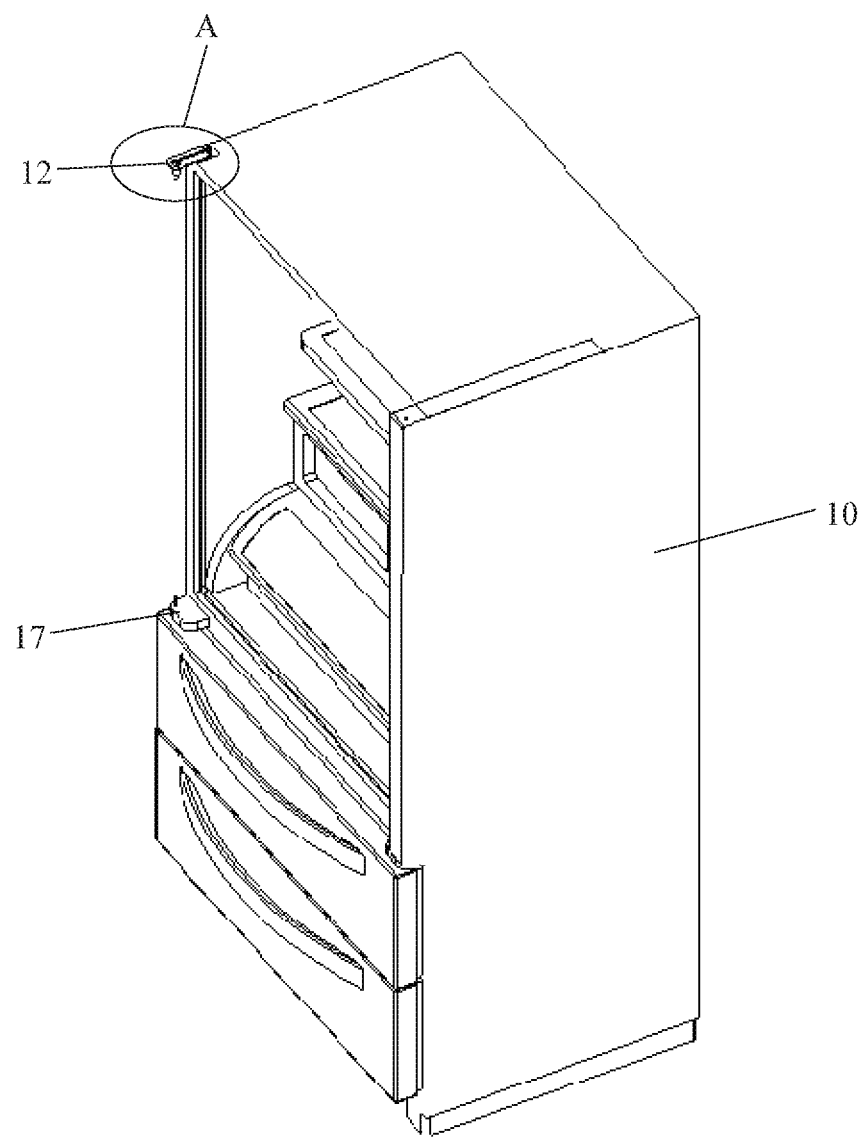
FIG. 1 is a perspective view of a main body of an electrical apparatus according to an embodiment.

The present disclosure will be described hereinafter in further detail with reference to the following embodiments, taken in conjunction with the accompanying drawings. In the specification, the same or similar reference numerals indicate the same or similar parts. The description of the embodiments of the present disclosure with reference to the accompanying drawings is intended to explain the general inventive concept of the present disclosure, and should not be constructed as a limitation to the present disclosure.

In the following detailed description, for the sake of explanation, numerous specific details are set forth in order to provide a thorough understanding of the disclosed embodiments. It will be apparent, however, one or more embodiments may also be practiced without these specific details. In other instances, well-known structures and devices are illustrated schematically in order to simplify the drawing.

An electrical apparatus according to an embodiment, as shown in FIGS. 1-4, comprises a main body 10, a pivotal part 20 pivotally connected to the main body 10, a first coil 11 mounted on the main body 10, and a second coil 21 mounted on the pivotal part 20. The first coil 11 at least partly passes through the second coil 21 to form an electromagnetic coupling between the first coil 11 and the second coil 21, so that power is wirelessly supplied between the main body 10 and the pivot part 20.

In the embodiment shown in FIGS. 1-8, the electrical apparatus is a refrigerator 1, and the pivotal part 20 comprises a refrigerator door which is mounted on a refrigerator main body 10 of the refrigerator by a hinge device 12.

As shown in FIGS. 1-4, in an embodiment, the first coil 11 acts as a transmitter coil and has a cylindrical shape, and the second coil 21 acts as a receiver coil and has a hollow cylindrical shape. The transmitter coil at least partially passes through the receiver coil, and the receiver coil is pivotally moved relative to the transmitter coil about a pivot axis of the hinge device 12. In this way, power may be wirelessly transmitted from the transmitter coil to the receiver coil, thereby realizing power transmission from the refrigerator main body to the refrigerator door. In another embodiment, the first coil 11 and the second coil 21 are configured to achieve signal transmission from the refrigerator door to the refrigerator main body.

Figure 2:
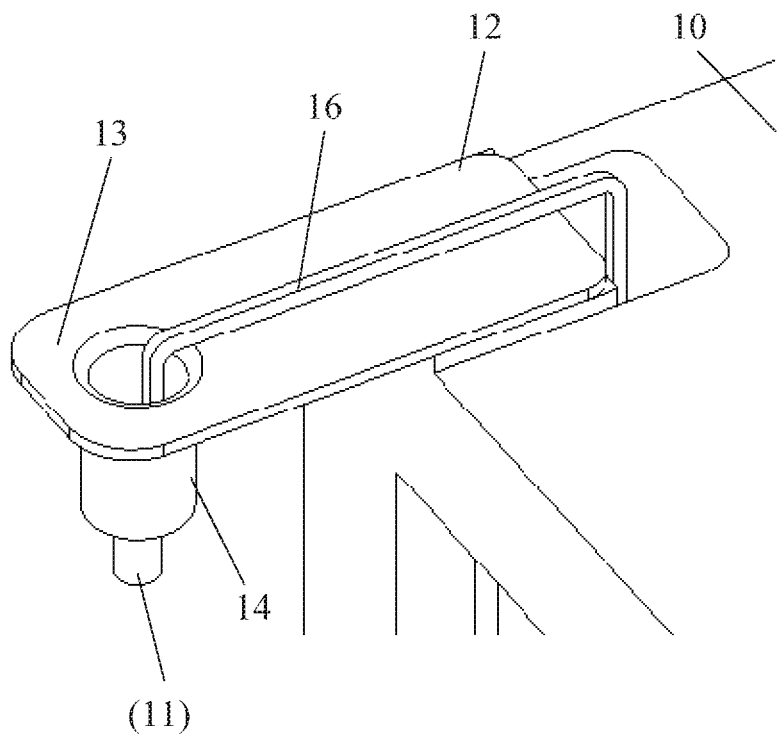
FIG. 2 is an enlarged perspective view of a portion A of the main body of FIG. 1.
Figure 3:
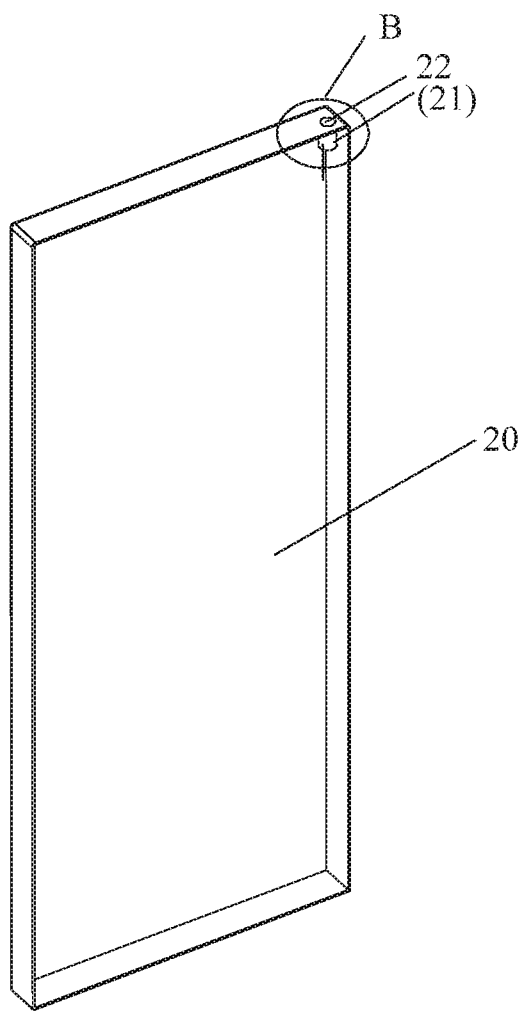
FIG. 3 is a perspective view of a pivotal part of the electrical apparatus of FIG. 1.
Figure 4:
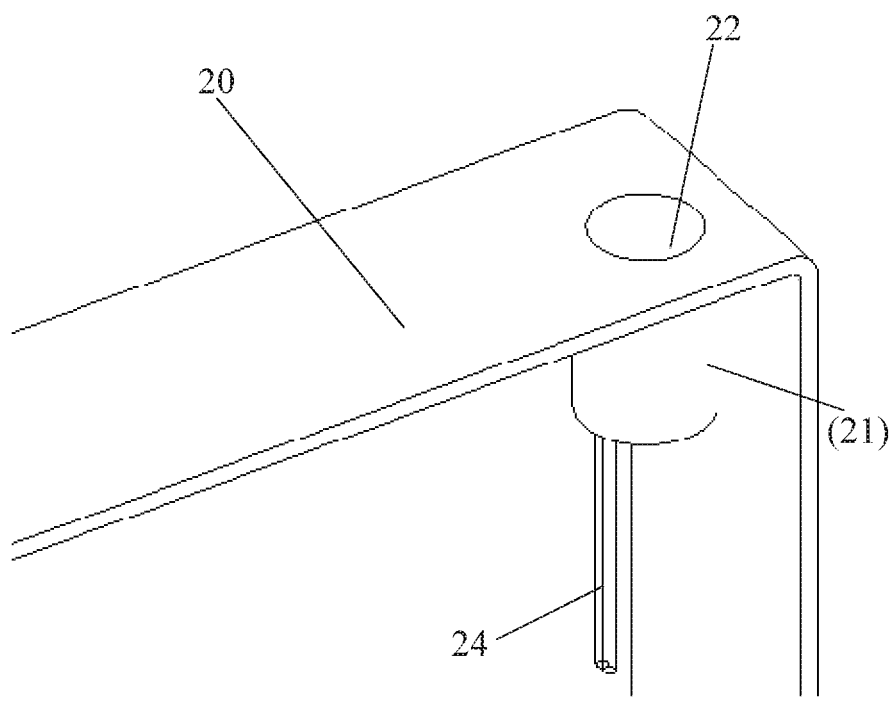
FIG. 4 is an enlarged perspective view of a portion B of the pivotal part of FIG. 3.

As shown in FIG. 2, the hinge device 12 comprises a mounting portion 13 mounted on the main body 10 and an insertion portion 14 fixed on the mounting portion 13, near a free end of the mounting portion 13. The first coil 11 is arranged in the insertion portion 14 and, in the shown embodiment, the first coil 11 protrudes from the insertion portion 14. As shown in FIG. 4, a receiving groove 22 is provided on the refrigerator door or pivotal part 20, and the second coil 21 is arranged in the receiving groove 22. The insertion portion 14 of the hinge device 12 is inserted into the receiving groove 22, so that the first coil 11 at least partially passes through the second coil 21. In the embodiment shown in FIG. 2, the insertion portion 14 is formed as a cylinder.

As shown in FIG. 2, the hinge device 12 includes an electric wire 16 connected from the first coil 11 (or the transmitter coil) to a control system of the refrigerator 1, which is located in the refrigerator main body 10. In an embodiment, the transmitter coil 11 is adapted to receive power from the refrigerator main body 10 via the electric wire 16 to achieve wireless transmission of power from the transmitter coil 11 to the receiver coil 21. In another embodiment, the first coil 11 is adapted to receive a signal from a control system of the electrical apparatus via the electric wire 16 and transmit it to the second coil 21. In another embodiment, the first coil 11 is adapted to transmit a signal received from the second coil 21 to the control system of the electrical apparatus via the electric wire 16.

As shown in FIGS. 5-8, the hinge device 12 further includes a plastic body 15, in which the first coil 11 is fixed, and the plastic body 15 is fixed in the cylinder of the insertion portion 14, thereby fixing the first coil 11 in the insertion portion 14. In an embodiment, the plastic body 15 may be made of a pouring sealant.

As shown in FIGS. 5-8, a bearing portion 23 is disposed in the receiving groove 22. The second coil 21 is fixed to the bearing portion 23, thereby fixing the second coil 21 in the receiving groove 22. In an embodiment, the second coil 21 is fixed by a double-sided adhesive tape.

Figure 5:
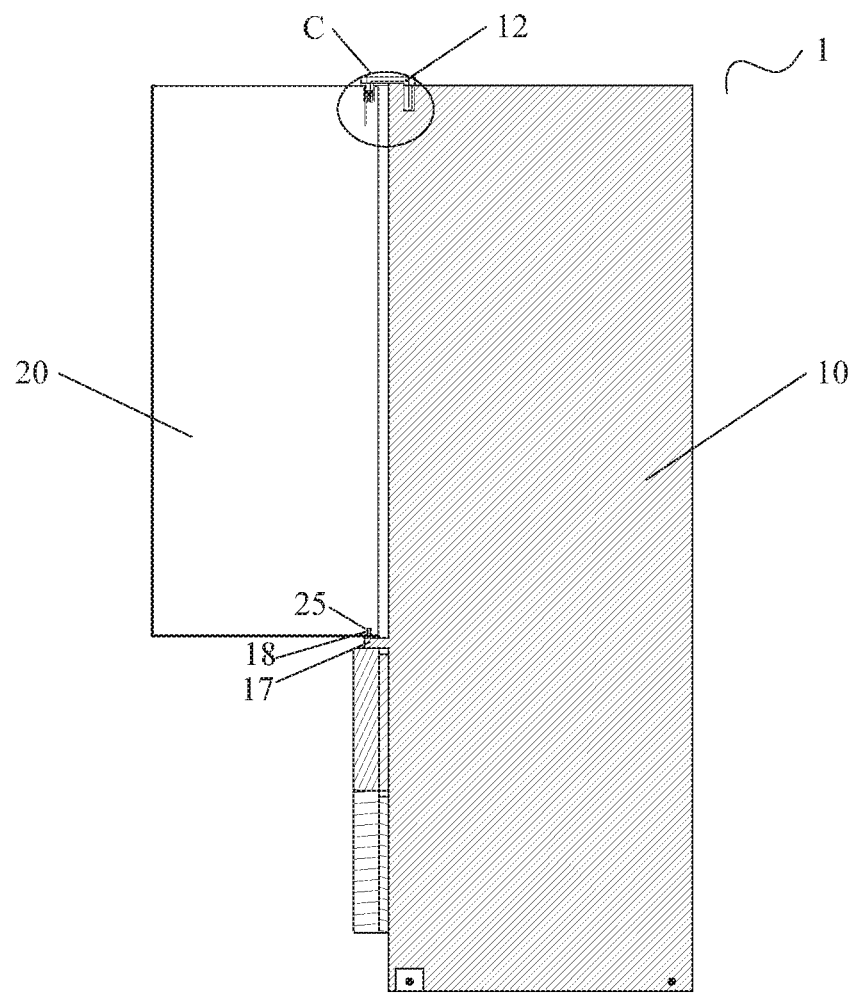
FIG. 5 is a sectional side view of the electrical apparatus of FIG. 1 with the pivotal part mounted on the main body.
Figure 6:
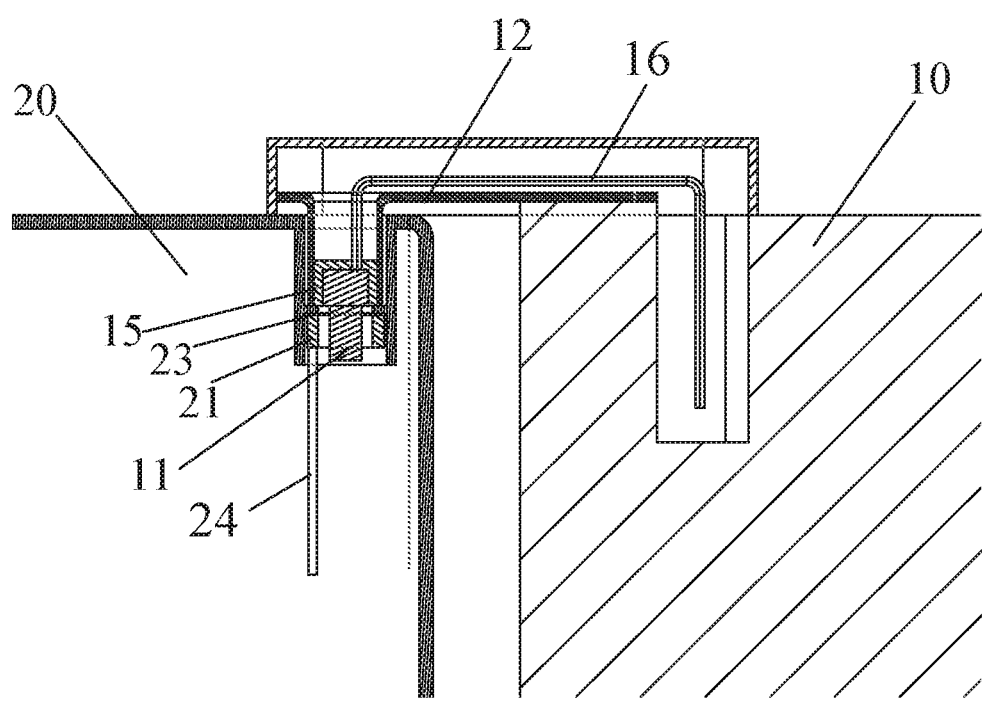
FIG. 6 is an enlarged sectional side view of a portion C of the electrical apparatus of FIG. 5.
Figure 7:
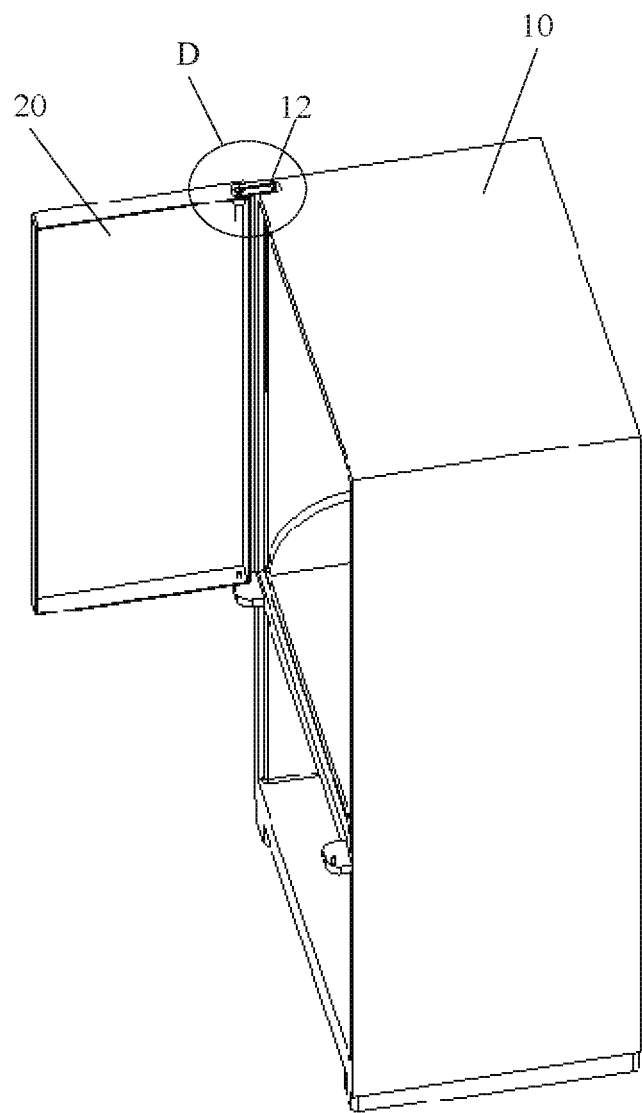
FIG. 7 is a perspective view of the electrical apparatus of FIG. 5.
Figure 8:
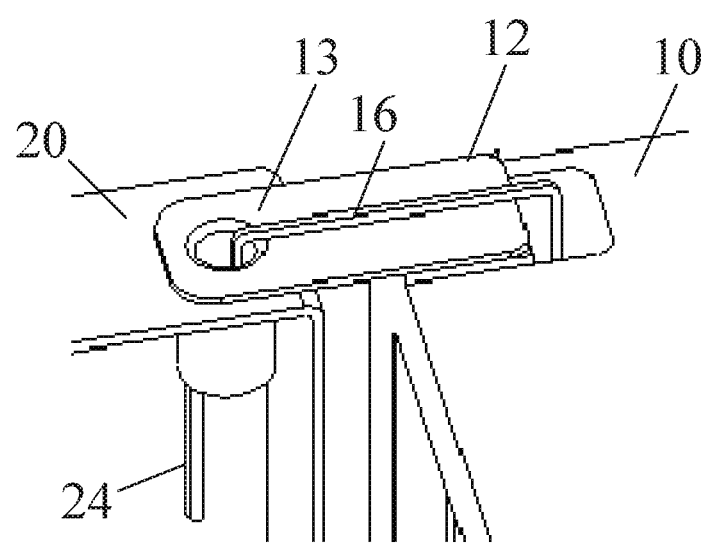
FIG. 8 is an enlarged perspective view of a portion D of the electrical apparatus of FIG. 7.
Figure 9:
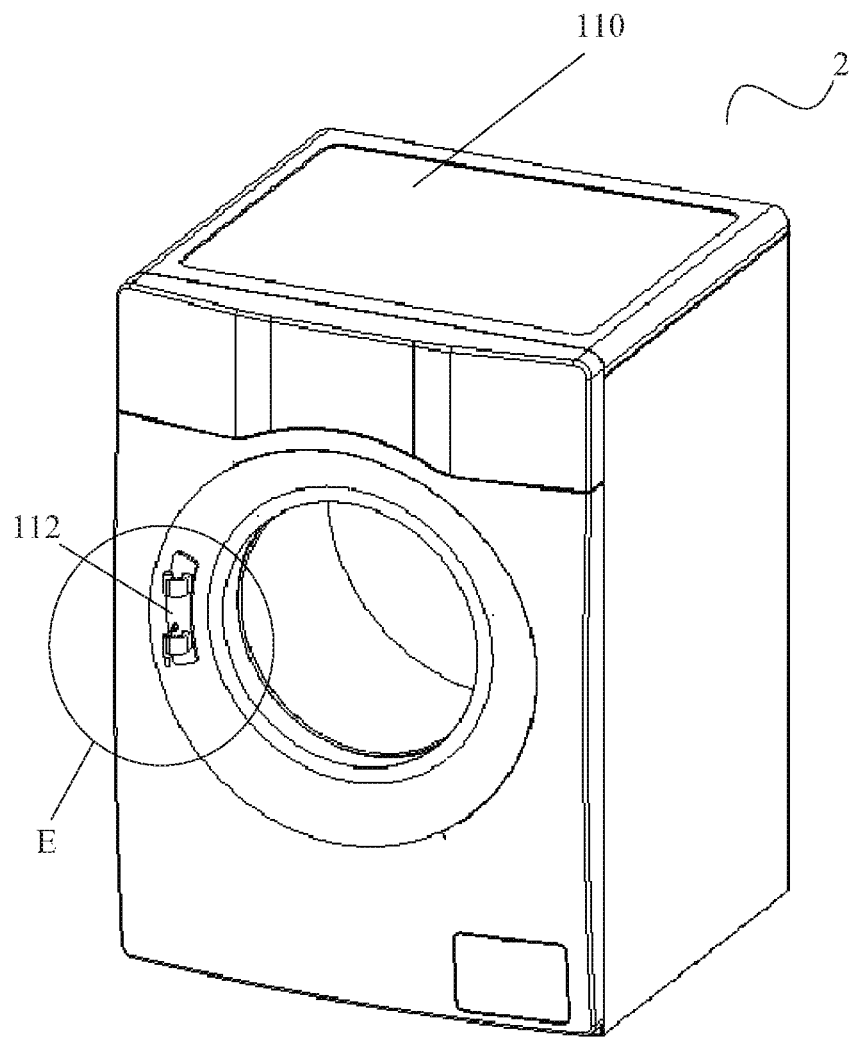
FIG. 9 is a perspective view of a main body of an electrical apparatus according to another embodiment.

As shown in FIGS. 1, 5 and 7, the refrigerator 1 further includes a supporting part 17 mounted at a position of the main body 10 which is engaged with a lower end of the refrigerator door or pivotal part 20. The supporting part 17 has a protrusion 18, the lower end of the refrigerator door or pivotal part 20 is correspondingly provided with a mounting groove 25, and the protrusion 18 is inserted into the mounting groove 25, so as to support the refrigerator door during pivoting movement of the refrigerator door. In another embodiment, the hinge device 12 may further be configured to support the refrigerator door during the pivoting movement of the refrigerator door.

When the refrigerator door or pivotal part 20 is mounted to the refrigerator main body 10 by the hinge device 12, a portion of the first coil 11 completely passes through the second coil 21, and the first coil 11 is overlapped with the second coil 21 at a position thereof in the pivot axis of the hinge device 12, thereby generating electromagnetic coupling therebetween. When the refrigerator door is opened or closed, the second coil 21 is pivoted relative to the first coil 11, and a relative position of the first coil 11 and the second coil 21 in the pivot axis remains unchanged throughout the pivoting movement, so that the power may be supplied between the first coil 11 and the second coil 21 in a wireless manner. In an embodiment, the power may be transmitted from the refrigerator main body 10 to the refrigerator door or pivoting part 20, and then the power may be supplied to a load, such as a display device, on the pivoting part 20 via an electric wire 24 provided on the second coil 21 and shown in FIGS. 4, 6, and 8.

An electrical apparatus according to another embodiment, as shown in FIGS. 9-12, comprises a main body 110, a pivotal part 120, a first coil 111, and a second coil 121. The first coil 111 at least partly passes through the second coil 121 to form electromagnetic coupling between the first coil 111 and the second coil 121, so that power is wirelessly supplied between the main body 110 and the pivotal part 120.

In the embodiment shown in FIGS. 9-16, the electrical apparatus comprises a washing machine 2 and the pivotal part 120 is a washing machine door which is mounted on the main body 110 of the washing machine 2 by a hinge device 112. As shown in FIGS. 9-12, in an embodiment, the first coil 111 acts as a transmitter coil and is in a cylindrical shape and the second coil 121 acts as a receiver coil and is in a hollow cylindrical shape. The transmitter coil at least partially passes through the receiver coil and the receiver coil is pivotally moved relative to the transmitter coil about a pivot axis of the hinge device 112. In this way, power may be wirelessly transmitted from the transmitter coil to the receiver coil, thereby realizing power transmission from the main body 110 of the washing machine 2 to the pivotal part 120 or washing machine door. In another embodiment, the first coil 111 and the second coil 121 may be configured to achieve signal transmission from the washing machine door to the main body 110 of the washing machine 2.

Figure 10:
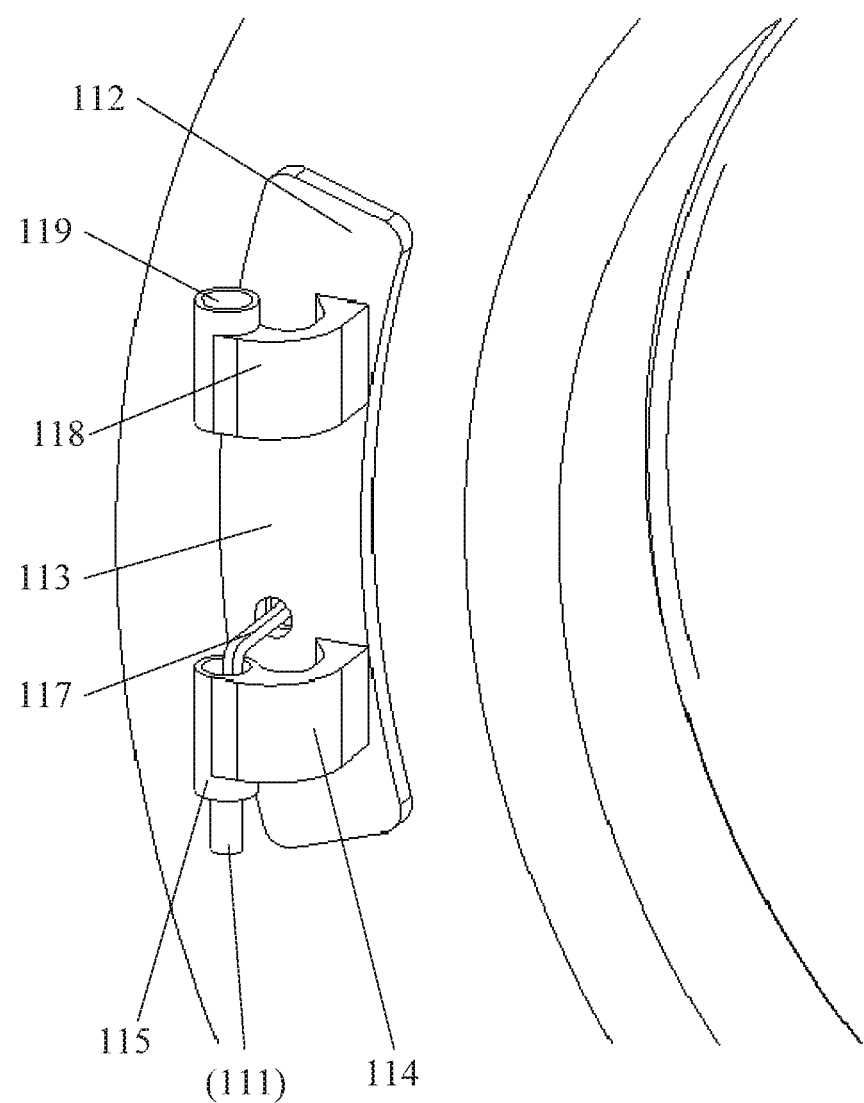
FIG. 10 is an enlarged perspective view of a portion E of the main body of FIG. 9.
Figure 11:
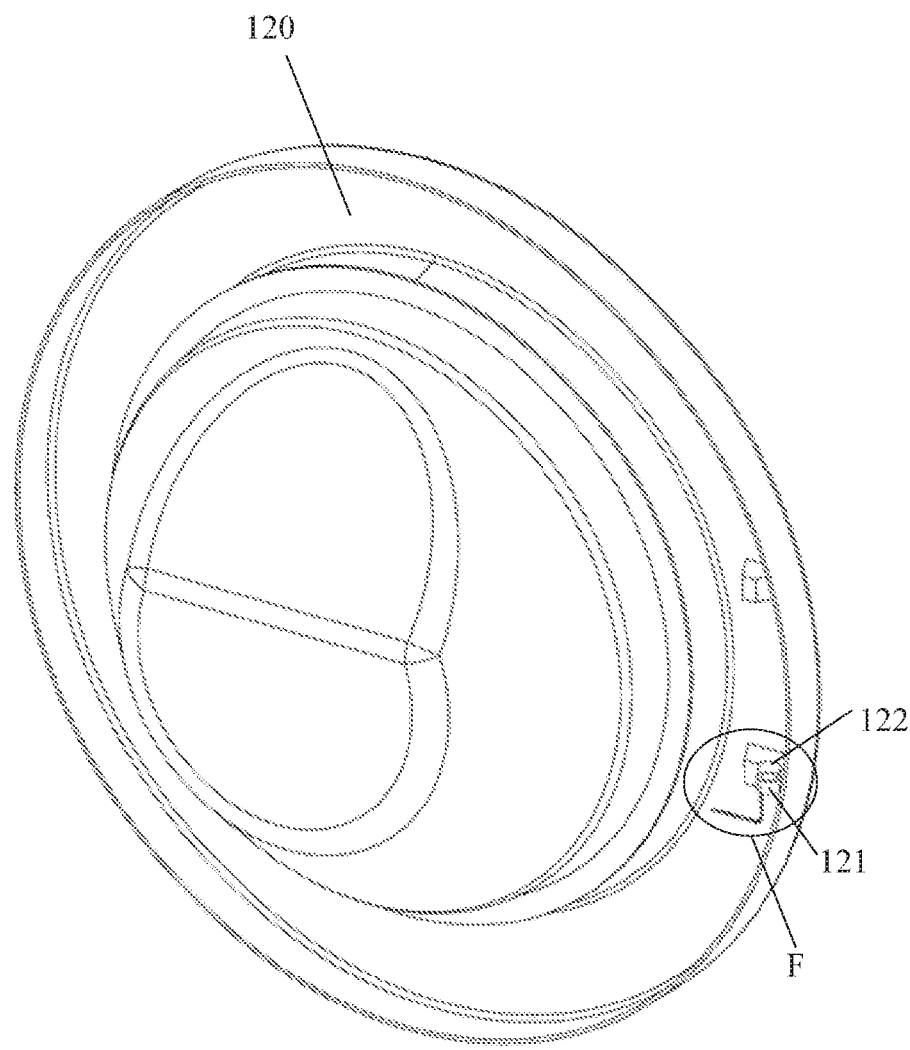
FIG. 11 is a perspective view of a pivotal part of the electrical apparatus of FIG. 9.
Figure 12:
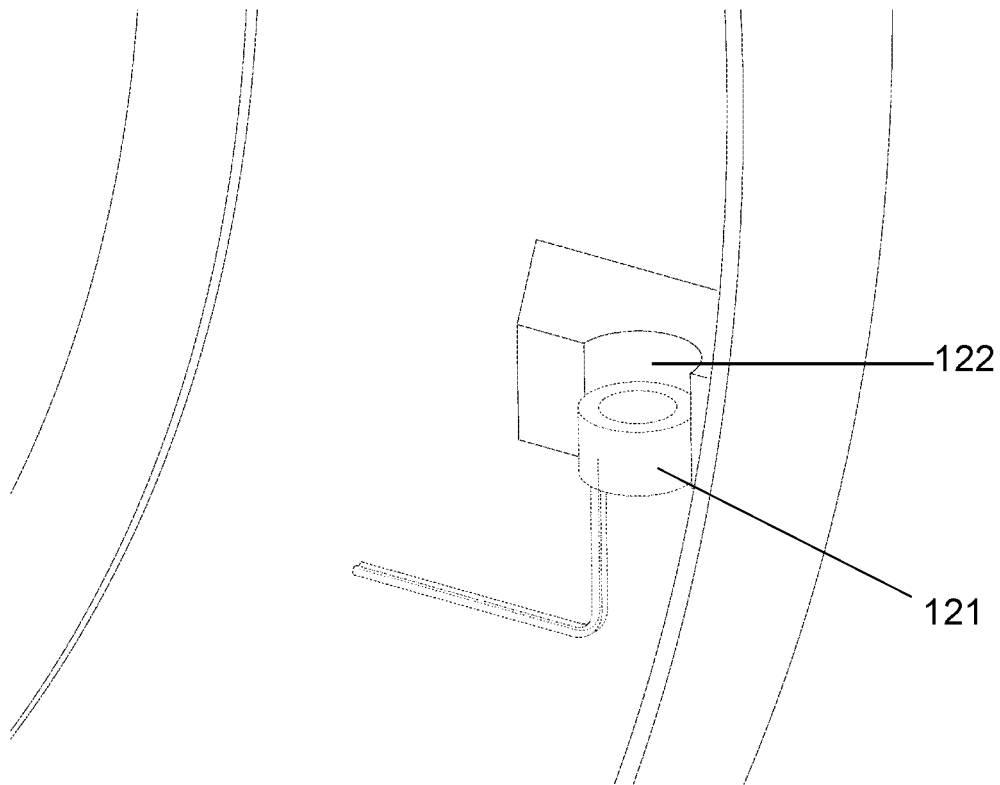
FIG. 12 is an enlarged perspective view of a portion F of the pivotal part of FIG. 11.
Figure 13:
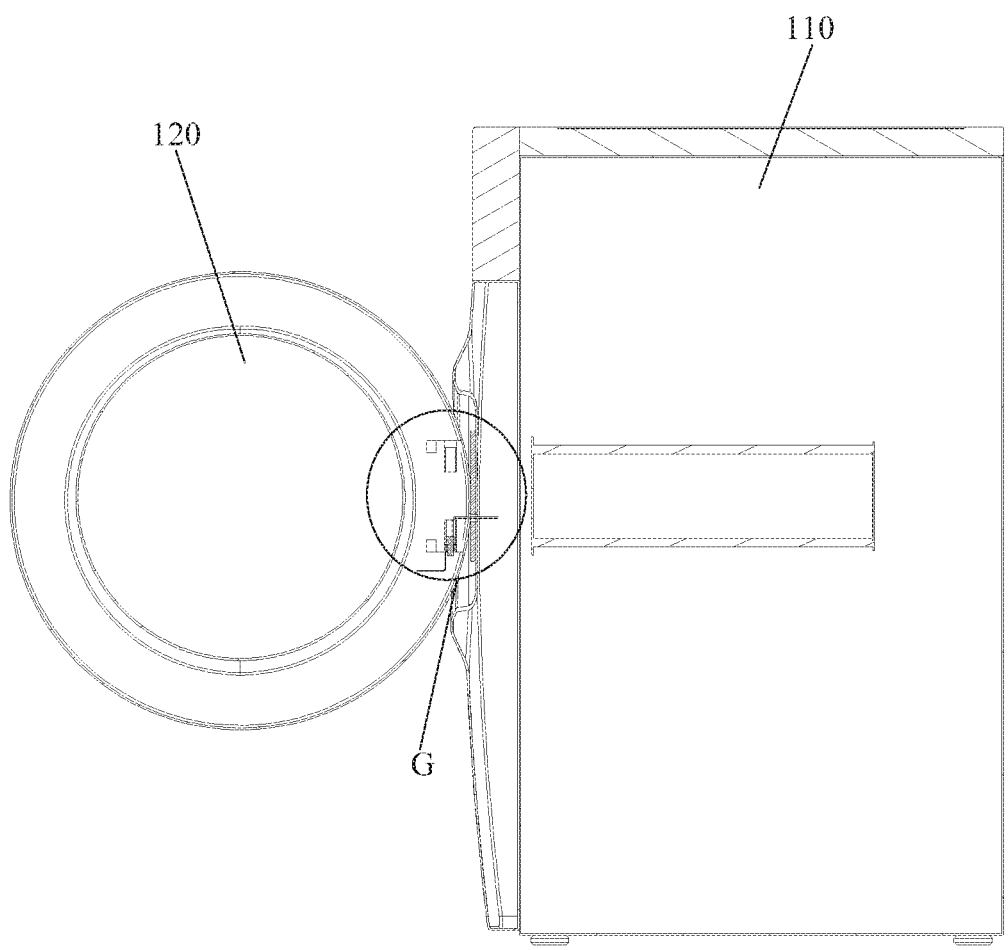
FIG. 13 is a sectional side view of the electrical apparatus of FIG. 9 with the pivotal part mounted on the main body.

As shown in FIG. 10, the hinge device 112 includes a base 113 mounted on the main body 110 of the washing machine 2, a mounting portion 114 mounted on the base 113, and an insertion portion 115 fixed on the mounting portion 114, for example, at a free end of the mounting portion 114. The first coil 111 is arranged in the insertion portion 115. In the shown embodiment, the first coil 111 protrudes from the insertion portion 115. As shown in FIG. 12, a receiving groove 122 is provided on the washing machine door or pivotal part 120, and the second coil 121 is arranged in the receiving groove 122. The insertion portion 115 of the hinge device 112 is inserted into the receiving groove 122, so that the first coil 111 at least partially passes through the second coil 121. As shown in FIG. 10, the insertion portion 115 is formed as a cylinder.

As shown in FIGS. 13-16, the hinge device 112 further includes a plastic body 116, in which the first coil 111 is fixed, and the plastic body 116 is fixed in the cylinder of the insertion portion 115, thereby fixing the first coil 111 in the insertion portion 115. In an embodiment, the plastic body 116 may be made of a pouring sealant.

As shown in FIGS. 9-16, a bearing portion 123 is provided in the receiving groove 122. The second coil 121 is fixed to the bearing portion 123, thereby fixing the second coil 121 in the receiving groove 122. In an embodiment, the second coil 121 is fixed by a double-sided adhesive tape.

Figure 14:
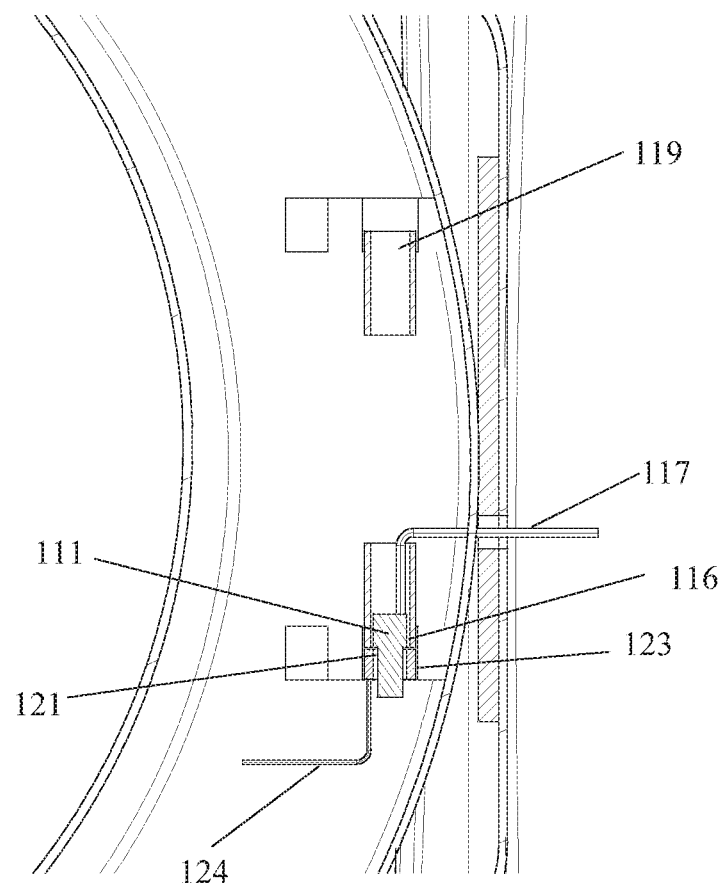
FIG. 14 is enlarged sectional side view of a portion G of the electrical apparatus shown in FIG. 13.
Figure 15:
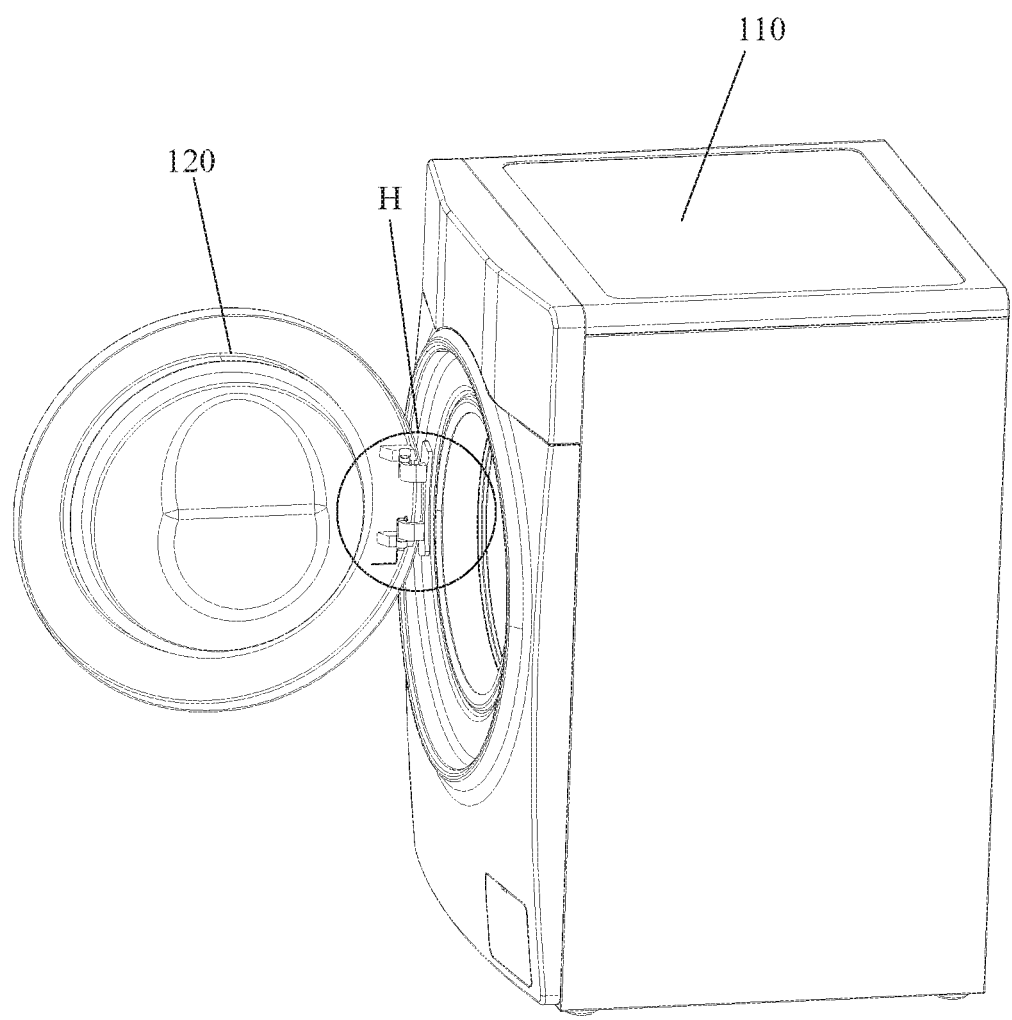
FIG. 15 is a perspective view of the electrical apparatus of FIG. 13.

As shown in FIG. 14, the hinge device 112 further includes an electric wire 117 connected from the first coil 111 (or the transmitter coil) to a control system of the washing machine 2, which is located in the main body 110 of the washing machine 2. In an embodiment, the transmitter coil is adapted to receive the power from the main body 110 of the washing machine 2 via the electric wire 117 to achieve wireless transmission of power from the transmitter coil to the receiver coil. In a further embodiment, the first coil 111 is adapted to receive a signal from a control system of the electrical apparatus via the electric wire 117 and transmit it to the second coil 121. In another embodiment, the first coil 111 is adapted to transmit a signal received from the second coil 121 to the control system of the electrical apparatus via the electric wire 117.

Figure 16:
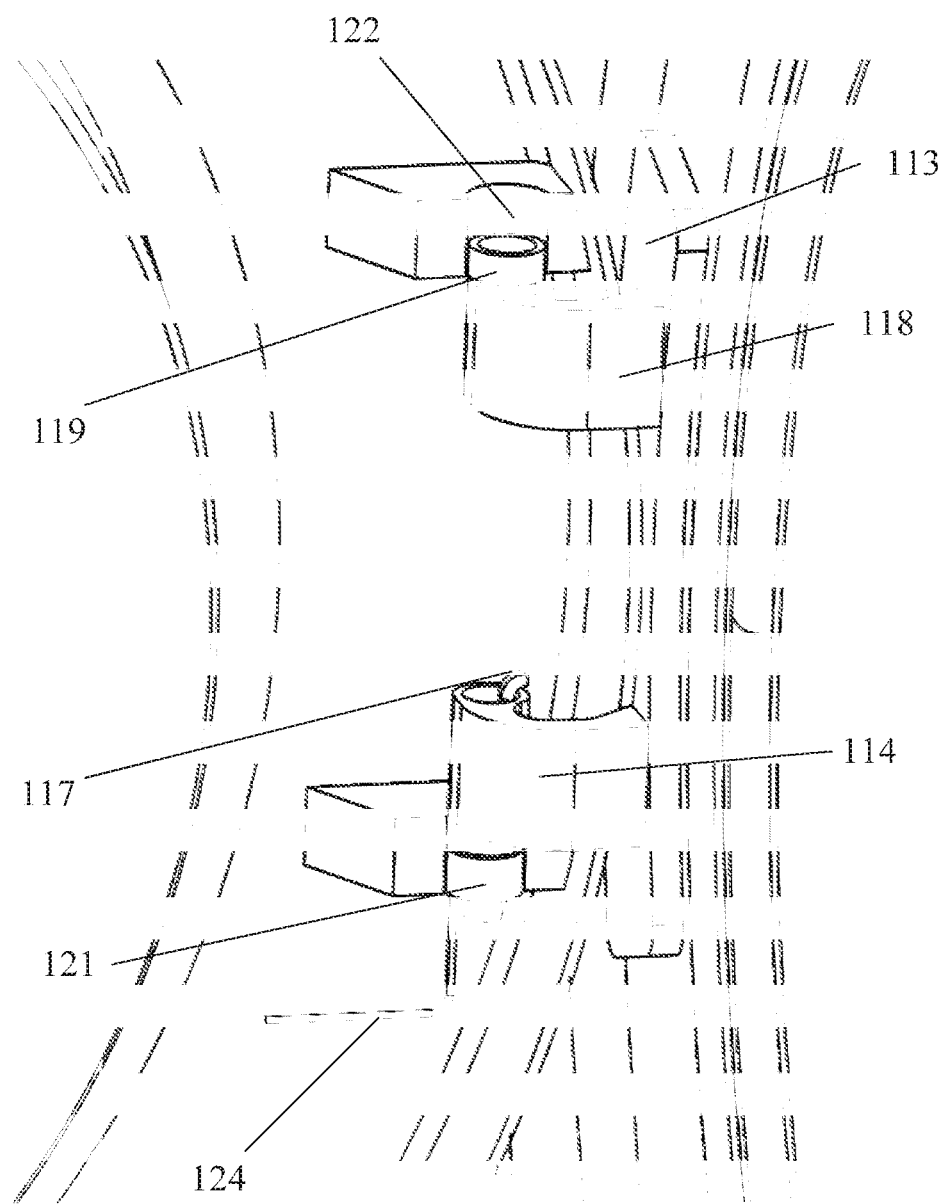
FIG. 16 is an enlarged perspective view of a portion H of the electrical apparatus of FIG. 15.

As shown in FIGS. 10, 14 and 16, the hinge device 112 further includes a second mounting portion 118 mounted on the base 113 and opposite to the mounting portion 114 and a second insertion portion 119 fixed on the second mounting portion 118 and inserted into the receiving groove 122 in the washing machine door or pivotal part 120. In the shown embodiment, the mounting portion 114 is provided under the second mounting portion 118. In another embodiment, the mounting portion 114 is provided above the second mounting portion 118.

When the washing machine door or pivotal part 120 is mounted to the main body 110 of the washing machine 2 by the hinge device 112, a portion of the first coil 111 completely passes through the second coil 121, and the first coil 11 is overlapped with the second coil 21 at a position thereof in the pivot axis of the hinge device 112, thereby generating electromagnetic coupling therebetween. When the washing machine door is opened or closed, the second coil 121 pivots relative to the first coil 111, and a relative position of the first coil 111 and the second coil 121 in the pivot axis remains unchanged throughout the pivoting movement, so that the power may be supplied between the first coil 111 and the second coil 121 in a wireless manner. In an exemplary embodiment of the present disclosure, the power may be transmitted from the main body 110 of the washing machine 2 to the washing machine door, and then the power may be supplied to a load, such as a display device, on the washing machine door or pivotal part 120 via an electric wire 124 provided on the second coil 121.

In the electrical apparatus according to above described embodiments, by wireless power transmission, it is unnecessary to arrange electrical wires in a hinge hole, simplifying the assembly and disassembly process of the electrical apparatus. The number of electricity consumption devices is not limited by the size of the hinge hole, significantly improving reliability of power supply.

It should be appreciated by those skilled in the art that the above embodiments are intended to be illustrative, modifications may be made to the above embodiments by those skilled in the art, and structures described in various embodiments may be freely combined without having structural and principle conflict, so that more kinds of electrical apparatus may be achieved according to the above disclosure.

What is claimed is:

1. An electrical apparatus, comprising:
a main body;
a pivotal part pivotally connected to the main body by a hinge device, the hinge device including a mounting portion mounted on the main body and an insertion portion fixed on the mounting portion;
a first coil mounted on the main body and arranged in the insertion portion; and
a second coil mounted on the pivotal part, the first coil at least partly passes through the second coil to form an electromagnetic coupling between the first coil and the second coil that wirelessly supplies power between the main body and the pivotal part.

2. The electrical apparatus according to claim 1, wherein the pivotal part has a receiving groove, the second coil is arranged in the receiving groove and the insertion portion is inserted into the receiving groove.

3. The electrical apparatus according to claim 2, wherein the insertion portion is a cylinder.

4. The electrical apparatus according to claim 3, wherein the hinge device has a plastic body fixed in the cylinder, the first coil is fixed in the plastic body.

5. The electrical apparatus according to claim 4, wherein the receiving groove has a bearing portion, the second coil is fixed to the bearing portion.

6. The electrical apparatus according to claim 5, wherein the first coil has a cylindrical shape and the second coil has a hollow cylindrical shape.

7. The electrical apparatus according to claim 2, wherein the hinge device includes a base mounted on the main body, the mounting portion is mounted in the base.

8. The electrical apparatus according to claim 7, wherein the hinge device includes a second mounting portion mounted on the base and opposite the mounting portion.

9. The electrical apparatus according to claim 8, wherein the hinge device includes a second insertion portion fixed on the second mounting portion and inserted into the receiving groove of the pivotal part.

10. The electrical apparatus according to claim 1, wherein the first coil acts as a transmitter coil, the second coil acts as a receiver coil, and the electromagnetic coupling is formed between the first coil and the second coil.

11. The electrical apparatus according to claim 1, wherein the electrical apparatus is a refrigerator and the pivotal part is a refrigerator door.

12. The electrical apparatus according to claim 1, further comprising a supporting part mounted at the main body, the supporting part is engaged with a lower end of the pivotal part.

13. The electrical apparatus according to claim 12, wherein the supporting part has a protrusion and the lower end of the pivotal part has a mounting groove, the protrusion is inserted into the mounting groove.

14. The electrical apparatus according to claim 1, wherein the electrical apparatus is a washing machine and the pivotal part is a washing machine door.

15. The electrical apparatus according to claim 1, wherein a relative position of the first coil and the second coil in a pivot axis of the hinge device remains unchanged during a pivoting movement of the pivotal part.

16. An electrical apparatus, comprising:
a main body;
a pivotal part pivotally connected to the main body by a hinge device and having a receiving groove;
a bearing portion disposed in the receiving groove;
a first coil mounted on the main body; and
a second coil mounted on the pivotal part and arranged within the receiving groove, the first coil at least partly passes through the bearing portion and the second coil to form an electromagnetic coupling between the first coil and the second coil that wirelessly supplies power between the main body and the pivotal part.

17. An electrical apparatus, comprising:
a main body;
a pivotal part pivotally connected to the main body by a hinge device and having a receiving groove, the hinge device including a mounting portion mounted on the main body, a cylindrical insertion portion fixed on the mounting portion and a plastic body arranged within the cylindrical insertion portion;
a bearing portion disposed in the receiving groove;
a first coil mounted on the main body and arranged within the plastic body insertion portion; and
a second coil mounted on the pivotal part, the first coil at least partly passes through the bearing portion and the second coil to form an electromagnetic coupling between the first coil and the second coil that wirelessly supplies power between the main body and the pivotal part.

18. The electrical apparatus of claim 17, wherein the first coil does not contact the second coil.

19. The electrical apparatus of claim 17, wherein the insertion portion contacts the bearing portion in an axial direction of the hinge on a side of the bearing portion opposite the second coil.

20. The electrical apparatus of claim 19, wherein the plastic body contacts the bearing portion on the side of the bearing portion opposite the second coil.

* * * * *